US006583211B1

(12) United States Patent
Wayts

(10) Patent No.: US 6,583,211 B1
(45) Date of Patent: Jun. 24, 2003

(54) MOLDABLE COMPOSITE MATERIAL

(76) Inventor: Thomas A. Wayts, 12441 Lincoln St., Paris, OH (US) 44669

( * ) Notice: Subject to any disclaimer, the term of this patent is extended or adjusted under 35 U.S.C. 154(b) by 0 days.

(21) Appl. No.: 09/735,028

(22) Filed: Dec. 12, 2000

(51) Int. Cl.$^7$ ................................................. C08K 3/04
(52) U.S. Cl. .......................... 524/495; 521/40; 521/41; 521/42; 521/43; 521/44; 521/45; 524/434; 524/435; 524/440
(58) Field of Search ............................ 524/495, 434, 524/435, 440; 521/40–45

(56) References Cited

U.S. PATENT DOCUMENTS

| | | | | | |
|---|---|---|---|---|---|
| 3,665,059 A | * | 5/1972 | Mahlman | ..................... | 260/897 |
| 4,128,602 A | * | 12/1978 | Katchman | ................... | 260/876 |
| 4,174,358 A | * | 11/1979 | Epstein | ........................ | 525/183 |
| 5,010,122 A | * | 4/1991 | Koski | ........................... | 524/80 |
| 5,185,394 A | * | 2/1993 | Ishida | ......................... | 524/269 |
| 5,364,696 A | * | 11/1994 | Wagner | ................... | 428/318.6 |
| 5,523,328 A | * | 6/1996 | Rosenbaum et al. | ........... | 521/41 |
| 5,633,318 A | * | 5/1997 | Bowen | ......................... | 525/71 |
| 5,651,994 A | * | 7/1997 | Hara | ........................... | 524/526 |
| 5,886,078 A | * | 3/1999 | Sullivan et al. | ............. | 524/449 |
| 5,916,952 A | * | 6/1999 | Romenesko et al. | ........ | 524/493 |

* cited by examiner

*Primary Examiner*—Edward J. Cain
(74) *Attorney, Agent, or Firm*—Renner, Kenner, Greive, Bobak, Taylor & Weber

(57) ABSTRACT

A moldable heterogeneous composite material has a continuous plastic phase (30) and a discrete phase of unground rubber (20) dispersed in the continuous phase. The composite material can be formed from thermoplastic or thermosetting materials and pieces of rubber from used tires. The composite material of the present invention can be molded in a process having the steps of providing a flowable melt of plastic material (50), providing unground rubber pieces (70), mixing the plastic material with the rubber pieces to form a composite material, and molding the composite material into an article (10) having a desired shape. Molded articles formed from the composite of the present invention have high rigidity and good durability.

29 Claims, 1 Drawing Sheet

MOLDABLE COMPOSITE MATERIAL

TECHNICAL FIELD

The present invention relates to a moldable heterogeneous composite material having a continuous phase and a discrete phase dispersed in the continuous phase. Preferably, the continuous phase is plastic and the discrete phase is unground rubber. The composite material of the present invention can be molded by providing a flowable melt of a plastic material, providing pieces of unground rubber, mixing the flowable melt of plastic with the pieces of unground rubber to form a composite material, and molding the composite material into a desired shape to form useful articles having high rigidity and good durability.

BACKGROUND ART

The disposal of scrap or used tires poses a serious threat to our environment. Unlike other waste products, tires do not readily break down in air or soil. It has been estimated that three billion tires have been discarded into U.S. dumps and land fills. Often, whole tires are simply piled onto vacant space within the dump, creating an eyesore. There, the inner cavities of these tires collect rain water and provide a breeding ground for mosquitoes. As a further hazard, the discarded tires in these piles are often worn to the point where their reinforcing wires are exposed. The exposed wire can injure persons handling the tires or children that attempt to climb the piles.

In other instances, the tires are buried. Chemical reactions between the tires, soil, and air trapped in the cavity can create sufficient heat to ignite the tires, creating a dangerous fire hazard. For these reasons, there have been many attempts to recycle tires into useful products.

Attempts to recycle and reuse tires and other rubber products have focused on several techniques, including reclaiming the rubber through chemical processes, ultrasonic devulcanization, and grinding the rubber prior to mixing it with other components, such as plastics, for subsequent processing.

Reclaimed rubber is defined as the depolymerization product of vulcanized comminuted rubber which retains at least in part the cross links imparted by the vulcanization process of the original rubber. The reclaiming process involves complex and expensive chemical and thermal treatment.

Mixtures of ground rubber and plastic have been used to make molded articles such as automobile bumpers, paving blocks, cable reel drums, and flanges. For example, U.S. Pat. No. 5,733,943, to Doan, discloses a method of making street signs from used rubber tires. The rubber is put through a cryogenic grinding and screening process, then combined with a plastic material to form a moldable mixture. Unfortunately, compositions made with ground rubber lack the strength necessary to be used to mold rigid articles, such as posts and spacers for highway guardrails.

Highway guardrail posts and spacers must be composed of durable material impervious to weathering and resistant to corrosion. They must withstand the impact of flying stones and other debris. They are preferably made of inexpensive, easily manufactured materials. These posts have typically been made of wood, but wood is vulnerable to weathering and can be splintered by flying debris. A durable material which can be used to make highway guardrail posts and spacers is needed.

Used tires and other rubber articles pose a disposal problem. Previous attempts to recycle these articles by grinding or reclaiming the rubber have been complicated and costly. There is a need for a new and significantly improved process for making useful products from used tires and other rubber articles.

SUMMARY OF THE INVENTION

It is thus an object of the present invention to provide a moldable composite material having high rigidity that is a combination of plastic and unground rubber.

It is another object of the present invention to provide a molded article formed by a process comprising combining plastic and unground rubber to form a moldable composite material, and molding the composite material to form an article.

It is a further object of the present invention to provide a process for preparing a molded article from the composite material of the present invention.

The foregoing and other objects of the present invention, which shall become apparent as the detailed description proceeds, are achieved by providing a moldable heterogeneous composite material comprising a continuous plastic phase and a discrete phase of unground rubber dispersed in the continuous phase.

Other aspects of the present invention are attained by providing a process comprising providing a flowable melt of a plastic material, providing unground rubber pieces, mixing the plastic material with the rubber pieces to form a heterogeneous composite material, and molding the composite material into an article.

Still another object of the present invention is attained by providing a molded article formed by a process comprising providing a flowable melt of a plastic material, providing unground rubber pieces, mixing the plastic material with the rubber pieces to form a heterogeneous composite material, and molding the heterogeneous composite material to form an article.

Advantageously, pieces of unground rubber cut from used tires and other preformed rubber articles can be combined with thermosetting material, thermoplastic material, or mixtures thereof, to produce a composite material that has high rigidity. This composite material also has good weathering properties and durability. The cut pieces of tire can be used as is, without further processing to remove non-rubber components such as metal. It is not necessary to thermally or chemically treat the rubber prior to use. Expensive cryogenic grinding processes can be eliminated. The large rubber particles give enhanced strength to the composite material. The plastic used can be recycled plastic material. These facts, as well as others, allow this composite material to be molded, using a combination of extrusion and injection molding, into inexpensive, useful articles, such as highway guard rail posts, guard rail spacers, and fence posts.

These and other objects of the present invention, as well as the advantages thereof over existing prior art forms, which will become apparent from the description to follow, are accomplished by the improvements hereinafter described and claimed.

DETAILED DESCRIPTION OF THE PREFERRED EMBODIMENT

It has now been found that a heterogeneous composite material comprising unground rubber and plastic can be molded into useful products having high rigidity. The heterogeneous composite material of the present invention comprises two or more distinct phases. More particularly, the heterogeneous composite material of the present invention comprises a continuous phase and a discrete phase dispersed in the continuous phase, wherein the continuous phase comprises plastic and the discrete phase comprises unground rubber. The composite materials of the present invention can be molded to form useful articles having high rigidity and good durability.

The unground rubber pieces can be pieces from tires or other preformed articles containing rubber. As used throughout this specification, the phrase "rubber pieces" refers to pieces of material comprising natural rubber, synthetic rubber, or mixtures thereof, but should not be construed to limit the scope of the invention to pure rubber, natural or synthetic. As will be appreciated by one of ordinary skill in the art, tires contain filler materials, stabilizers, metal, and other components such as the metals and fabrics typically used to form tire plies and belts. The rubber pieces used in the composite of the present invention can consequently contain components additional to rubber as would typically be encountered in shredding a used tire. Although the unground rubber can be pieces of any type of rubber, economic advantage can be gained by recycling waste vulcanized rubber. Used rubber articles such as tires, belts, inner tubes, and hoses, or scraps that occur during the molding process are examples of sources of rubber pieces for the composite of the present invention.

To prepare the rubber pieces, the tires or other rubber articles are cut into strips. Advantageously, it is not necessary to remove the metal reinforcement belts, or other non-rubber components commonly used in tires.

The rubber pieces do not have to be of any particular shape. For example, they may be rectangular, circular, cubic, spheroidal, elongated, thread-like, or combinations thereof. Although the composite material can comprise any size rubber pieces, enhanced durability and rigidity is achieved when a majority of the rubber pieces are larger than crumb rubber. Crumb rubber is a term used by those of ordinary skill in the art to mean rubber that has been formed into small, uniform particles on the order of 30 mesh or smaller. A preferred size range for the rubber pieces used in the composite of the present invention is from about 10 mesh to a maximum size limited only by the size of the article molded from the composite material. A more preferred size range for the rubber pieces is larger than 0.25 inches in at least one dimension. Most preferably, the rubber pieces are larger than 1 inch in at least one dimension.

Figure 2:
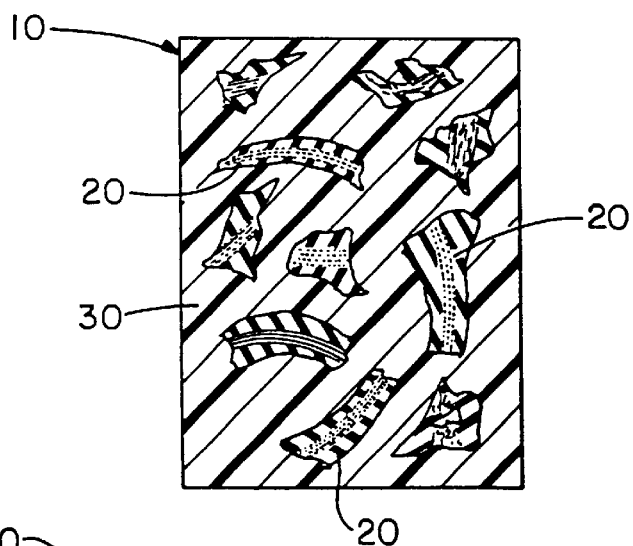
FIG. 2 is a sectional view as might be seen along line 2—2 of FIG. 1.

As described herein, the rubber pieces form a discrete phase in the heterogeneous composite material of the present invention. FIG. 2, which is a sectional view of an article 10 formed from the composite, illustrates that the discrete phase 20, comprising a sectional piece of a tire or the like, is dispersed in the continuous phase 30. Many of the discrete portions are unconnected, although two or more rubber pieces may be in contact with each other.

The plastic material used in the composite of the present invention can be thermosetting material, thermoplastic material, or mixtures thereof. Thermosetting materials are initially soft, but change irreversibly to a hard rigid form on heating. Examples of thermosetting material which may be used in the composite of the present invention include, but are not limited to, unsaturated polyesters, cross-linked polyimides, polyurethanes, polystyrene, terpolymers of polystyrene, copolymers of polystyrene, polyvinyl chloride, or mixtures thereof.

Thermoplastic materials can be repeatedly softened by heating and hardened again on cooling. Examples of thermoplastic material that may be used in the composite of the present invention include, but are not limited to, polyethylene, polypropylene, linear saturated polyesters, polyamides, polycarbonates, polyethylene terephthalate, acrylics, phenolics, or mixtures thereof. A preferred thermoplastic material is polyethylene. Mixtures of thermosetting and thermoplastic materials can also be used.

These plastic materials may also contain additives such as colorants, plasticizers, flame retardants, foaming agents, antistatic agents, antioxidants, heat stabilizers, antimicrobials, and other additives. Although these plastic materials are commercially available, or can be polymerized by using methods known in the art, economic advantage can be gained by using recycled plastic material.

When recycled plastic material is used in the composite of the present invention, the plastic is preferably in the form of flakes, granules, pellets, or mixtures thereof.

As described herein, the plastic material forms a continuous phase in the heterogeneous composite material of the present invention. Within this continuous phase is dispersed a discrete phase comprising unground rubber pieces.

The heterogeneous composite material of the present invention comprises from about 10 to about 97 weight percent unground rubber pieces, and from about 3 to about 90 weight percent plastic.

Optionally, the composite of the present invention may further comprise carbon black. Carbon black is defined as a fine carbon powder which can contain small quantities of oxygen, hydrogen, nitrogen, and sulfur, and is commercially available from a variety of suppliers. The amount of carbon black added to the composite of the present invention is preferably from about 0.75 to about 4 weight percent.

The composite of the present invention may optionally further comprise a UV stabilizer. Specific examples of UV stabilizers which may be used in the composite of the present invention include, but are not limited to, benzophenones, benzotriazoles, salicylates, nickel organic, monobenzoates, formamidine, oxalanilide, hindered amines, zinc oxide, and other proprietary products that are commercially available. The amount of UV stabilizer added to the composite of the present invention is preferably from about 0.25 to about 1.5 weight percent.

When additional components such as carbon black and UV stabilizer are added to the composite mixture, it will be appreciated that these components may be added in a variety of ways, and at varying times. In a preferred embodiment, additional components are added to the flowable melt of plastic material prior to mixing with the unground rubber pieces. In another preferred embodiment, additional components are added to the composite mixture prior to molding or extruding.

Plastic-containing materials may be formed and subsequently molded into useful articles by a variety of methods. For example, in extrusion processes, a plastic-containing material may be propelled continuously along a screw through varying regions of high temperature and pressure such that the plastic-containing material is melted and compacted and finally forced through a die shaped to give the final article a desired shape. The molding of thermoplastic-containing materials may likewise be accomplished by a number of devices and methods, including injection molding. In an injection molding process, the thermoplastic-containing material is generally preheated in a cylindrical chamber to a temperature at which it will flow and then forced into a relatively cold closed mold cavity by means of high pressure applied through a plunger. A reciprocating screw may be employed to deliver the feed to the mold.

In a preferred process, a flowable melt of a plastic material is mixed with pieces of unground rubber to form a composite material, which is then molded into the desired shape to form useful articles having high rigidity and good durability.

Figure 3:
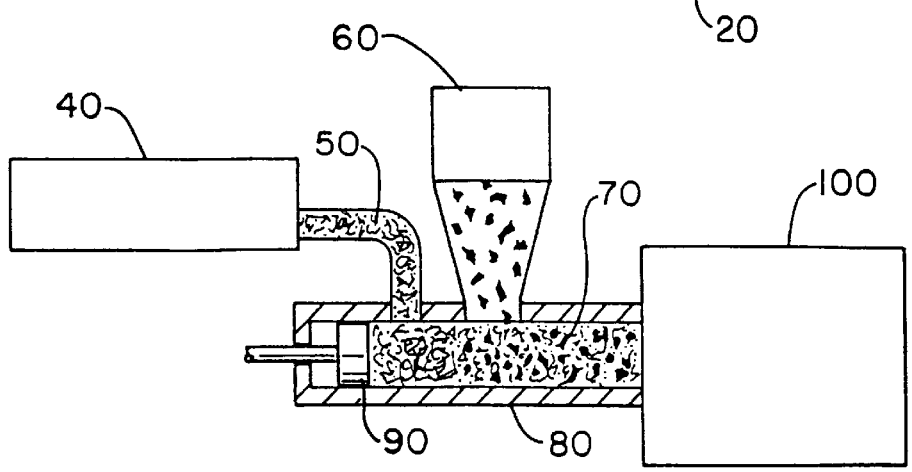
FIG. 3 is a flow chart depicting one embodiment of the process of the present invention.

In one embodiment, shown in FIG. 3, the flowable melt of plastic material is provided by feeding a desired amount of the plastic material into a plasticizing unit 40 which, through applied heat and/or the heat created by friction of a mixing device, melts the plastic material, creating a flowable melt 50. From a source 60 of unground rubber pieces, a quantity of pieces 70 is placed into a tube 80. The flowable melt of plastic material 50 is then forced into the tube 80. The flowable melt of plastic material surrounds, infiltrates, and mixes intimately with the pieces of unground rubber 70 to form a composite material. The composite material is then pushed by using a plunger 90 into a mold 100 of the desired shape and size, and compacted into a molded article. The molded article is cooled and ejected from the mold.

In an alternate embodiment, the rubber pieces are added to the plastic material prior to melting the plastic. Applying heat and/or friction to the mixture causes the plastic material to become a flowable melt, while the rubber pieces remain intact. The flowable melt of plastic material surrounds, infiltrates, and mixes intimately with the pieces of unground rubber to form a composite material, which can then be further processed as described above.

In an alternate embodiment, the composite material may be extruded through a suitable die, and cut to a preferred length.

An injection molding machine designed for thermosetting materials, such as those commercially available, may be used when a thermosetting material is the plastic component of the composite material of the present invention.

Any of the additives described above can be added to the plastic material, or to the composite material, prior to molding or extruding.

As will be appreciated by those of ordinary skill in the art, it is preferable to maintain the mixing and molding equipment at a suitable temperature. This temperature will vary depending upon the melting temperature of the plastic material.

As described above, the composite material of the present invention comprises two or more phases of matter. The pieces of rubber maintain their integrity throughout the molding process described above and comprise a discrete phase of matter. They are, in fact, distinguishable by visual inspection of the molded article. The plastic material, which infiltrates and surrounds the rubber pieces, comprises a second, continuous phase of matter.

Advantages of the process of the present invention include the use of pieces of rubber cut from tires "as is", without further processing to remove non-rubber components such as metal. Moreover, it is not necessary to thermally or chemically treat the rubber prior to use. Expensive cryogenic grinding processes are eliminated. The large rubber particles give enhanced strength to the composite material as illustrated in the impact test described in the example below.

Articles made by using the process described above include, but are not limited to, highway guard rail posts and spacers, and fence posts. Such articles have the corrosion resistant properties of the plastic components, and the good weathering properties of the rubber components.

Figure 1:
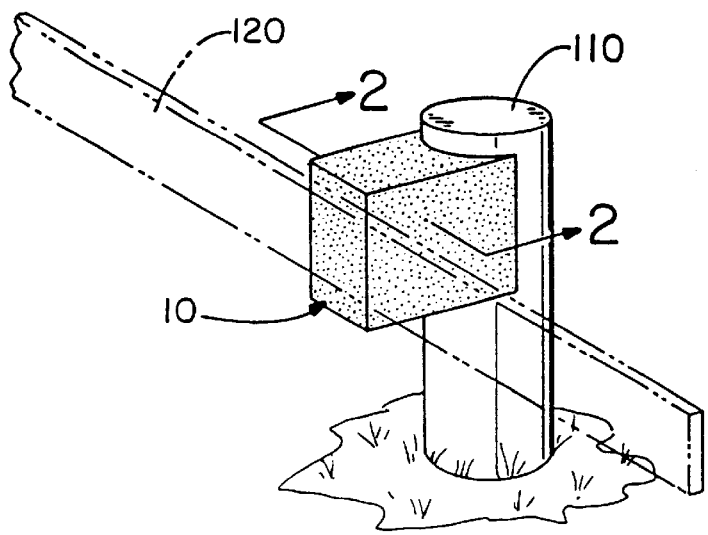
FIG. 1 is a perspective view of a guardrail, a guardrail spacer formed from the composite of the present invention, and a post.

In one embodiment, the molded article is used as a spacer for highway guard rails. In this embodiment, illustrated in FIG. 1, the spacer 10 is bolted to a support post 110 comprising steel or wood. The guardrail 120 is attached to the spacer. When used with round wood posts, the spacer is molded to comprise a curved or circular back side to nestingly receive the round post. When used with steel posts, the spacer is molded to comprise a 110 millimeter (mm) wide×7 mm deep routing on the back side to fit against the flange of the steel support post.

EXAMPLE

A molded article of dimensions 150 mm×200 mm×360 mm was prepared by extruding melted polypropylene into a steel cage containing cut pieces of tires, such that the polypropylene was forced into and around the pieces, then this mixture was injected into injection molding equipment to form a composite block having the above dimensions. The molded composite block article contained about 60–70 weight percent rubber pieces, about 30–40 weight percent polypropylene, about 1.25 weight percent carbon black, and about 1.25 weight percent UV stabilizer.

Pendulum tests were conducted on the composite block, using a 1347 kilogram weight dropped through a 3 meter vertical distance to strike the block, which had been bolted to a standard steel post set in compacted soil. In all repeated trials, the posts failed near ground line and the composite blocks remained essentially intact.

It should now be apparent that various embodiments of the present invention accomplish the objects of this invention. It should be appreciated that the present invention is not limited to the specific embodiments described above, but include variations, modifications, and equivalent embodiments defined by the following claims.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of true scope and breadth of the invention, reference should be made to the following claims.

What is claimed is:

1. A process for forming a rigid molded article comprising:

providing a flowable melt of plastic material;

providing unground rubber pieces, wherein at least one of the rubber pieces contains a metal reinforcement, and wherein a majority of the rubber pieces have a particle size of greater than about 0.25 inches;

mixing the plastic material with the rubber pieces to form a composite material; and molding the composite material into an article having a desired shape.

2. The process of claim 1, wherein the step of providing a flowable melt of plastic material comprises placing the plastic material into a plasticizer and heating the material to a temperature greater than the melting point of the plastic material.

3. The process of claim 1, wherein the plastic material is selected from the group consisting of thermosetting materials, thermoplastic materials, and mixtures thereof.

4. The process of claim 1, wherein the unground rubber pieces are formed from shredding tires.

5. The process of claim 1, wherein the article is a spacer for highway guardrails.

6. The process of claim 1, wherein the article is a post for highway guardrails.

7. A rigid molded article formed by a process comprising providing a flowable melt of plastic material, providing unground rubber pieces that are formed from tires, wherein a portion of the rubber pieces contain a metal reinforcement, and wherein the majority of the pieces have a particle size of greater than about 0.25 inches, mixing the plastic material with the unground rubber pieces to form a heterogeneous composite material, and molding the composite material into an article.

8. The molded article of claim 7, wherein the process further comprises providing carbon black and a UV stabilizer, and adding the carbon black and UV stabilizer to the heterogeneous composite material prior to molding.

9. The molded article of claim 7, wherein the heterogeneous composite material comprises:
   (a) a continuous plastic phase; and
   (b) a discrete phase of unground rubber dispersed in the continuous phase.

10. The molded article of claim 7, wherein the article is a spacer for highway guardrails.

11. The molded article of claim 7, wherein the article is a post for highway guardrails.

12. The process of claim 1, further comprising the step of adding carbon black to the composite material prior to the step of molding the composite material into an article.

13. The process of claim 1, further comprising the step of adding an ultraviolet stabilizer to the composite material prior to the step of molding the composite material into an article.

14. The article of claim 7, wherein the plastic material comprises polyethylene.

15. A rigid molded article comprising a continuous plastic phase and a discrete phase of unground rubber, wherein the rubber comprises pieces of vulcanized rubber formed from tires, wherein a portion of the pieces of vulcanized rubber contain a metal reinforcement, and wherein the majority of pieces have a particle size or greater than 0.25 inches.

16. The article of claim 15, wherein the article is a spacer for highway guardrails.

17. The article of claim 15, wherein the article is a post for highway guardrails.

18. The article of claim 15, wherein the plastic phase comprises polyethylene.

19. The article of claim 15, further comprising from about 0.75 to about 4 weight percent carbon black.

20. The article of claim 15, further comprising from about 0.25 to about 1.5 weight percent of a UV stabilizer.

21. The article of claim 15, wherein the metal reinforcement is a belt.

22. The article of claim 15, wherein the metal reinforcement is a wire.

23. A rigid molded article comprising a continuous plastic phase and a discrete phase of unground rubber, wherein the rubber comprises pieces formed from tires, at least one of said rubber pieces having a metal reinforcement.

24. The molded article of claim 23, wherein the article is a spacer for highway guardrails.

25. The molded article of claim 23, wherein the article is a post for highway guardrails.

26. The molded article of claim 23, wherein the plastic phase comprises polyethylene.

27. The molded article of claim 23, further comprising from about 0.75 to about 4 weight percent carbon black.

28. The molded article of claim 23, wherein the metal reinforcement is a belt.

29. The molded article of claim 23, wherein the metal reinforcement is a wire.

* * * * *